United States Patent [19]

Misra et al.

[11] Patent Number: 4,889,778

[45] Date of Patent: Dec. 26, 1989

[54] ALKALI METAL POLYSILICA GEL ELECTROLYTE LEAD-ACID BATTERY AND METHOD FOR MAKING THE SAME

[75] Inventors: Sudhan S. Misra, Lansdale; Terrence M. Noveske, Pipersville, both of Pa.

[73] Assignee: C & D Power Systems, Inc., Plymouth Meeting, Pa.

[21] Appl. No.: 185,501

[22] Filed: Apr. 25, 1988

Related U.S. Application Data

[62] Division of Ser. No. 79,086, Jul. 29, 1987.

[51] Int. Cl.$^4$ .................................... H01M 10/10
[52] U.S. Cl. .................................... 429/190; 429/225
[58] Field of Search ............ 429/190, 189, 225, 204; 252/189, 315.01, 315.5, 145; 361/526; 204/414

[56] References Cited

U.S. PATENT DOCUMENTS

| | | |
|---|---|---|
| 1,389,750 | 9/1921 | Gardiner . |
| 1,416,195 | 5/1922 | Hacking . |
| 1,417,007 | 5/1922 | Williams . |
| 1,572,586 | 2/1926 | Weir . |
| 2,483,868 | 10/1949 | Archer et al. . |
| 2,631,117 | 3/1953 | Hanchey ........................ 429/192 |
| 3,202,611 | 8/1965 | Canty et al. ................... 252/62.2 |
| 3,257,237 | 6/1966 | Jache . |
| 3,271,199 | 9/1966 | Beste et al. .................... 429/190 |
| 3,305,396 | 2/1967 | Rauter ........................... 429/190 |
| 3,328,208 | 6/1967 | Ryhiner .......................... 429/190 |
| 3,457,112 | 7/1969 | Reber ............................. 429/190 |
| 3,506,750 | 4/1970 | Nabiullin et al. .............. 429/190 |
| 3,556,860 | 1/1971 | Amlie ............................ 429/118 |
| 3,578,504 | 5/1971 | Hamlen et al. ................ 429/190 |
| 3,709,737 | 1/1973 | Fujimoto et al. .............. 29/623.1 |
| 3,711,332 | 1/1973 | Bastacky ........................ 429/190 |
| 3,716,412 | 2/1973 | Peters . |
| 3,765,943 | 10/1973 | Biagetti ........................... 141/32 |
| 3,776,779 | 12/1973 | Johnson . |
| 3,885,988 | 5/1975 | Bohle ............................... 141/32 |
| 3,904,434 | 9/1975 | Sekido et al. ................... 429/59 |
| 4,038,462 | 7/1977 | Rohr ............................... 429/30 |
| 4,140,840 | 2/1979 | Ruben . |
| 4,147,843 | 4/1979 | Hakkinnen ..................... 429/189 |
| 4,150,199 | 4/1979 | Tuphorn et al. . |
| 4,238,556 | 12/1980 | Hradcovsky et al. . |
| 4,288,913 | 9/1981 | Parsen et al. .................. 29/623.5 |
| 4,317,872 | 3/1982 | Varma ........................... 429/190 |
| 4,414,302 | 11/1983 | Jache et al. .................... 429/190 |

*Primary Examiner*—Anthony Skapars

[57] ABSTRACT

A lead-acid battery having thixotropic gel electrolyte comprising a blend of alkali metal polysilica and sulfuric acid. A method for producing a lead-acid battery having thixotropic gel electrolyte may be a continuous or an intermittent process. An aqueous colloidal dispersion may be produced by blending dry alkali metal polysilica with water and the gel electrolyte is provided by combining the aqueous collodial dispersion of alkali metal polysilica with liquid sulfuric acid.

40 Claims, 3 Drawing Sheets

ALKALI METAL POLYSILICA GEL ELECTROLYTE LEAD-ACID BATTERY AND METHOD FOR MAKING THE SAME

This is a division, of application Ser. No. 79,086, filed July 29, 1987.

BACKGROUND OF THE INVENTION

1. Field of the Invention

This invention relates to lead-acid batteries having gelled electrolytes and methods for making such batteries.

2. Description of the Prior Art

Gelled electrolyte lead-acid batteries are known and have been available for commercial use since the early 1920's, as evidenced by the May 15, 1921 issue of *The Commercial Car Journal*, page 102.

Of the patent prior art, U.S. Pat. Nos. 1,389,750; 1,416,195; 1,417,007; 1,572,586; 2,483,868; 3,305,396; 3,257,237; 3,457,112 and 3,711,332 are known to applicant. Other patent prior art known to applicants includes U.S. Pat. Nos. 2,631,117; 3,202,611; 3,257,237; 3,271,199; 3,305,396; 3,328,208; 3,457,112; 3,506,750; 3,556,860; 3,578,504; 3,709,737; 3,716,412; 3,765,943; 3,776,779; 3,885,988; 3,904,434; 4,140,840; 4,147,843; 4,150,199; 4,238,556; 4,039,462; 4,288,913; 4,317,872; and 4,414,302. Of these, 3,711,332 is most relevant to the apparatus aspect of this invention while 2,483,868 and 3,305,396 are most relevant to the method aspect of this invention.

Concerning the apparatus aspect of the invention, 3,711,332 discloses utilizing a ratio of sulfuric acid to aqueous sodium silicate solution ($Na_2SiO_3$) of from 6:1 to 10:1 to form the electrolyte gel, with the ratio of sodium silicate to water forming the aqueous sodium silicate solution being about 1:1. Sodium silicate, $Na_2SiO_3$, as disclosed and taught by 3,711,332, is conventionally referred to as "water glass."

3,711,332 uses electrolyte which forms a liquid phase above the gel phase in the battery, with the two phase system (consisting of the liquid and the gel) changing proportions during battery operation. The liquid phase enters the gel phase during battery discharge and reemerges from the gel phase during battery charging. Depending upon the assumption used for the specific gravity of the sodium silicate and the resultant sodium silicate solution, the ratio of sodium silicate to sulfuric acid ranges from 5.5 to 9.1 in 3,711,332 (for sodium silicate specific gravity of 2.4), ranges from 14.6 to 19.4 in 3,711,332 (for sodium silicate specific gravity of 1.4) and ranges from 10.9 to 18.2 in 3,711,332 (for sodium silicate specific gravity of 1.2).

U.S. Pat. No. 2,483,868 discloses production of 94% anhydrous silica gel at column 1, line 4. Silica, as sodium silicate solution, is sprayed into sulfuric acid to form a sol which turns to a gel as taught at column 2, line 7 of '868. As high as 17% silica results. The sulfuric acid is maintained in a baffled tank.

U.S. Pat. No. 3,305,396 recites that it is known to produce colloidally dispersed silicon as silicic acid for use in dry electrolytes, having a silica particle size of five (5) to twenty (20) microns or less, as taught at column 1, lines 26 and 31. '396 relates to dry cells with electrolytes consisting of sulfuric acid with colloidal silicic acid, as taught at column 1, line 60. A thixotropic electrolyte consisting of sulfuric acid and colloidally dispersed silicic acid is reduced to liquid in a high speed mixer and introduced into the cell housing in an evacuated space, as taught at column 1, line 69. The silicic acid is produced by the pyrogenic method from silicon tetrachloride and is free from alkaline substances, as taught at column 3, line 5.

U.S. Pat. No. 2,631,117 discloses a battery additive product and process. The process includes pulverizing an alumino-silicate shell and mixing the pulverized product with hot sulfuric acid to facilitate extraction of occluded soluble portions. The mixture is then filtered while hot and added to a hydroxide to alkalize the mixture and precipitate the ions to form an insoluble hydroxide. The precipitate is separated by filtration and acidified to convert dissolved salts to free acids and then concentrated to form the product. Addition of the alumino-silicate shell to the electrolyte maintains lead sulfate in suspension and prevents it from precipitating on to the surface of the plates.

U.S. Pat. No. 3,202,611 discloses a thixotropic electrolyte for an electrolytic capacitor, which is particulate silica in the 0.015 to 0.020 micron range in a solution of acid containing 5–8% by weight of particulate silica to 92–95% by weight of acid. The acid is preferably sulfuric or hydrochloric acid.

U.S. Pat. No. 3,271,199 discloses a gelled storage battery electrolyte including a solution of aqueous sulfuric acid, pectin and colloidal silica. The electrolyte preferably contains about 0.3% of pectin by weight of the sulfuric acid solution. The pectin and colloidal silica are mixed in a dry state and then the mixture is combined with the sulfuric acid electrolyte.

U.S. Pat. No. 3,328,208 discloses a lead storage battery and process of making a lead storage battery with a solidified electrolyte.

The process includes intimately mixing pulverulent dry pectin and a supporting material such as natural rubber, synthetic rubber or thermoplastic materials having a softening point below the decomposition temperature of pectin, processing the mixture to foils, sandwiching the foils between electrode plates and impregnating the foils with battery acid in an amount sufficient to produce a swollen pectin gel.

U.S. Pat. No. 3,457,112 discloses a lead-acid storage battery including lead electrodes of opposite polarity being free of antimony with an active lead mass supported by the electrodes. A nonfluid electrolyte is interposed between and contacting adjacent electrodes, with the nonfluid electrolyte consisting of a mixture of aqueous sulfuric acid and a thickening agent. The thickening agent compound should be present in an amount in excess of 0.2% of the weight of the aqueous sulfuric acid. Sufficient thickening agent is added to render the electrolyte nonfluid.

U.S. Pat. No. 3,506,750 discloses manufacture of galvanic cells containing coaxially disposed positive and negative electrodes with current conductors and an ion conducting diaphragm separating the electrodes. The method includes subjecting the electrolyte to preliminary gelling followed by simultaneously pressing in and molding the pregelled electrolyte and at least one electrode into the casing of the galvanic cell.

U.S. Pat. No. 3,556,860 discloses a storage battery and electrolyte precursor. The invention includes a sulfuric acid gel formed by incorporating the reaction product of oxides of boron and phosphorous into sulfuric acid. The sulfuric acid is a concentrated sulfuric acid having a concentration of at least about 95%. The invention also includes gelation of the sulfuric acid which contains free oleum or sulphur trioxide up to about 30%.

U.S. Pat. No. 3,578,504 discloses a method of activating a silver oxide-zinc primary cell. The method includes mixing together 5–40 weight percent of magnesium oxide powder in an aqueous alkaline electrolyte to form a pourable electrolytic solution. The assembled cell is filled with the electrolytic solution through a vent opening and then closed to allow the viscosity of the solution to increase to form a gel prior to discharging the cell to prevent silver migration after discharging.

U.S. Pat. No. 3,709,737 discloses a leak proof battery and method of manufacturing the same. The method of the invention includes forming a mixture of thermoplastic synthetic resin powder and hydrated silica gel around an assembly of positive and negatives plates, enclosing the composition and plates and heating the same in steam at a temperature above 100° C. in order to soften and melt at least a portion of the resin powder, solidifying the resin to form a liquid absorbable porous body integral with the negative and positive plates, impregnating the absorbable porous body with an electrolyte and inserting the absorbable porous body and the positive and negative plates within a battery container.

U.S. Pat. No. 3,716,412 discloses a lead-acid battery wherein the electrolyte contains sulfuric acid, water and silica. The electrolyte contains 5–30 grams of amorphous silica per liter of electrolyte and the resulting composition is non-thixotropic. Interestingly, '412 teaches that at higher concentration of silica to sulfuric acid electrolyte, specifically above 100 grams of silica per liter, the electrolyte thickens significantly and has a thixotropic property which '412 notes "appears to reduce the materials ability to wet the separators and the active material and thus reduces the battery's performance." (Column 3, lines 10–12).

U.S. Pat. No. 3,765,943 discloses a process for fabrication of positive electrodes for lead-acid batteries wherein the electrodes are fabricated from grids filled with paste and including the steps of reacting lead oxide in an aqueous suspension with sulfuric acid at 80°–100° C. to produce tetrabasic lead sulfate. The lead-containing material contains lead oxide of at least 90% by weight of an orthorhombic modification, the aqueous suspension in which the reaction takes place is preacidified to a pH range of 1–3.5 prior to the addition of lead oxide and the tetrabasic lead sulfate is separated from the aqueous suspension within one hour after complete addition of the sulfuric acid.

U.S. Pat. No. 3,776,779 discloses a battery electrolyte containing a polyglycol polymer. The electrolyte is gelled by silica and a polyethylene glycol polymer in a small but effective amount to serve as a stabilizer for the electrolyte, which is adequate to render the electrolyte non-thixotropic, i.e. solid as opposed to viscous, and which also serves to decrease the tendency of gelled electrolyte to physically break down by cracking and shrinking during battery use.

U.S. Pat. No. 3,885,988 discloses a method for filling adjacent insulating tubes forming a positive plate of a lead-acid storage battery. The method includes adding supplementary water to a paste-like mixture to reduce the viscosity to form a suspension with the water serving as a carrier for the paste. Then the suspension is rapidly injected under pressure into the tubes before the supplementary carrier water separates from the suspension. The suspension is injected in sufficient quantity to provide the predetermined volume of paste for the battery tubes, with the supplementary water then being separated from the paste-like mixture and from the suspension. The suspension preferably consists of lead oxide dust, red lead, sulfuric acid and water.

U.S. Pat. No. 3,904,434 discloses a sealed lead storage battery which uses lead having an equilibrium potential electrochemically more negative than hydrogen and lead oxide as a positive electrode active material. The electrolyte of the battery is a gel obtained by adding 20% silica sol concentrated sulfuric acid in a proportion of 2 cc per 1 gram of $SiO_2$.

U.S. Pat. No. 4,140,840 discloses a lead-sulfuric acid storage battery having grids supporting the cathodic and anodic reactants of the cell, with at least one of the grids comprising a base of one of the metals iron, nickel, stainless steel and alloys of iron and nickel. The base has a coating of tin-nickel alloy. Positive grids within the battery have an outer layer of lead peroxide constituting the cathodic reactant, a gelled electrolyte of sulfuric acid and an encapsulating epoxy resin hermetically sealing the battery.

U.S. Pat. No. 4,147,843 discloses an electrolyte precursor composition for use in galvanic batteries wherein the electrolyte flows as a liquid solution. The composition includes a paste-like mixture of concentrated sulfuric acid and powdered chromic acid.

U.S. Pat. No. 4,150,199 discloses a precursor for an electrical storage battery including a positive and negative plates between separator plates. Each separator plate consists of a densely compressed compact containing 70–100% of silica capable, when soaked with a liquid electrolyte, of forming a pressure-resistant gel and 0–30% of acid-resistant and oxidation-resistant fibers, typically polyester. The precursor converts into an operative storage battery upon introduction of sulfuric acid electrolyte into the housing whereupon the silica combines with the acid to form a gelled separator.

U.S. Pat. No. 4,238,556 discloses a lead acid cell having a lead negative electrode, a lead dioxide positive electrode and an electrolyte consisting of a sulfuric acid solution having a cellulosic catalyst dissolved therein to prevent sulfation of the electrodes. The catalyst is preferably nitrocellulose, cellulose nitrate or camphor.

U.S. Pat. No. 4,038,462 discloses a solid-electrolyte battery with a multiplicity of anode and cathode spaces forming electrode spaces arranged in parallel in straight lines attached to collecting spaces and alternately disposed in an iron conducting body of solid electrolyte. The electrode spaces have adjacent electrode spaces of opposite plurality wherein the anode spaces comprise a set of hollow recesses, in the body of the solid electrolyte, forming anode channels closed at one end and open at the other end to a first collecting space in the body of the solid electrolyte. The cathode spaces comprise a second set of hollow recesses in the body of the solid electrolyte, forming cathode channels closed at one end and open at the other end to a second collecting space disposed in the body of the solid electrolyte. The first and second collecting spaces having locking lids.

U.S. Pat. No. 4,288,913 discloses a method of forming in situ gelled anodes. The method includes mixing a powdered anode metal with a gelling agent and with liquid means other than the gelling agent for maintaining, during subsequent gelling, a homogenous mixture of the powdered metal, the gelling agent and a liquid. The gelling agent is capable of gelling the powdered anode metal when in the presence of an aqueous electrolyte solution. The resulting ungelled mixture is dispensed into an electrolyte solution in an electrochemical cell, whereby the substantially homogeneously gelled anode is formed in situ.

U.S. Pat. No. 4,317,872 discloses a lead-acid battery with gel electrolyte. The battery includes a container, a plurality of alternating positive and negative electrodes and separators between the electrodes. The separators include a silicate component mixed with an oxygen compound of boron to form a microfibrous mat. The battery also contains a gel electrolyte in substantial physical contact with the positive and negative electrodes and separators in each cell. The electrolyte has a sulfuric acid component and an $SiO_2$ silica component derived from an aqueous colloidal dispersion of silica ($SiO_2$) particles with a means causing a negative electric charge on the surface to cause the particles to repel each other and catalyze the formation of a siloxane cross linkage, having each atom of silicon bonded to four (4) atoms of oxygen, i.e. $SiO_4$.

U.S. Pat. No. 4,414,302 discloses a method of making a lead storage battery. The battery includes a thixotropic gel electrolyte consisting substantially of sulfuric acid and a silicon dioxide gelling agent. The electrolyte may also include a small portion of orthophosphoric acid which electrochemically bonds in the active material of the electrodes. The battery thereafter is filled with the gelling agent and sulfuric acid.

Prior art practice includes using solid fumed silica ($SiO_2$) and combining that with $H_2SO_4$ in a mixing process which takes about 12 hours and pouring the resultant slurry into a dry charged battery. This process is exceedingly time consuming and expensive.

Aqueous dispersions of colloidal alkali metal silicas are known for use as binders in ceramic investment shell casting and foundries with alcohol being combined with the aqueous colloidal dispersion when faster shell drying and earlier green strength is desired. Using an aqueous colloidal dispersion of an alkali metal polysilica, specifically sodium polysilica, results in ceramic investment shell castings having very smooth surfaces and very close design tolerances.

In the past, some artisans have mixed dry fumed silica with sulfuric acid to provide a gel for introduction into a lead-acid battery precursor. This mixing procedure is quite time consuming, typically taking from 18 to 24 hours for mixing. The dry fumed silica is very fine, making it very difficult to handle. The dry fumed silica-sulfuric acid blend is difficult to keep sufficiently liquid so that the blend flows easily enough to be introduced into the battery precursor. In this prior practice, the fumed silica blend material is converted into the gel form before being introduced into the battery; the thixotropic characteristic of the gel blend material makes it feasible to hold the gel in a liquid condition through continuous mixing and to introduce it into the battery, but with some difficulty.

SUMMARY OF THE INVENTION

A lead-acid battery exhibiting surprising and unexpected performance characteristics has an improved thixotropic gel electrolyte consisting essentially of a blend of (a) an aqueous colloidal dispersion of from about ten percent (10%) to about fifty percent (50%), preferably from about fifteen percent (15%) to about thirty percent (30%) and most preferably of about thirty percent (30%) by weight alkali metal polysilica, having the formula $[Y_2O].x[SiO_2].nH_2O$ where x ranges from about 20 to about 350, Y is an alkali metal, preferably sodium, and n is the number of moles of water and (b) sulfuric acid, in a ratio of from about one (1) part of the aqueous colloidal dispersion of the alkali metal polysilica to about one (1) part sulfuric acid to about one (1) part of the aqueous colloidal dispersion of the alkali metal polysilica to about six (6) parts sulfuric acid, by volume. The conventional liquid sulfuric acid has specific gravity, prior to blending with the aqueous colloidal dispersion of the alkali metal polysilica, of from about 1.1 to about 1.5, most preferably about 1.3 to about 1.4. The battery exhibits surprising and unexpected performance characteristics relative to known thixotropic gel lead-acid batteries.

A formed wet battery or battery precursor from which free electrolyte has been removed is used to manufacture the gelled electrolyte lead-acid battery. Use of the formed wet battery or battery precursor substantially reduces manufacturing costs.

A method for producing a lead-acid battery having such an improved thixotropic gel electrolyte and exhibiting surprising and unexpected performance characteristics may be a continuous or an intermittent process. In one process an aqueous colloidal dispersion of about ten percent (10%) to about fifty percent (50%), preferably from about fifteen percent (15%) to about thirty percent (30%) and most preferably about thirty percent (30%) by weight alkali metal polysilica, having the formula $[Y_2O].x[SiO_2].nH_2O$, where x ranges from about 20 to about 350, Y is an alkali metal, preferably sodium, and n is the number of moles of water, is used. This aqueous colloidal dispersion may be produced by blending dry alkali metal polysilica with water such that the resulting aqueous colloidal dispersion of alkali metal polysilica has a specific gravity of about 1.1 to about 1.5, most preferably about 1.3 to about 1.4. The aqueous colloidal dispersion of the alkali metal polysilica may range in pH from about 8 to about 12 with a pH of 10 being preferable. pH is not a parameter sought to be controlled per se; monitoring and regulating pH is merely a means of maintaining stability of the aqueous colloidal dispersion formed using the alkali metal polysilica. Aqueous colloidal dispersions of sodium polysilica work well.

Once the aqueous colloidal dispersion of the alkali metal polysilica is provided, it may be and preferably is continuously dynamically combined with liquid sulfuric acid to provide the gel electrolyte. Preferably, the ratio of the aqueous colloidal dispersion of alkali metal polysilica to sulfuric acid is from about one (1) part aqueous colloidal dispersion of alkali metal polysilica to about (1) part sulfuric acid to about one (1) part aqueous colloidal dispersion of alkali metal polysilica to about six (6) parts sulfuric acid, by volume. The liquid sulfuric acid has a specific gravity prior to blending with the aqueous colloidal dispersion of the alkali metal polysilica of from about 1.1 to about 1.5, preferably about 1.3 to about 1.4. The preferred specific gravity varies depending on desired rate of battery discharge, desired battery float voltage and intended use of the battery.

This blended solution is preferably filled into a lead-acid battery precursor as the solution is dynamically blended by combining the aqueous colloidal dispersion of the alkali metal polysilica with the sulfuric acid; the resulting blended solution in the battery precursor defines a lead-acid battery.

Once the blended solution is placed into the precursor, the battery having the blended solution consisting of the aqueous colloidal dispersion of the alkali metal polysilica and sulfuric acid is maintained in a quiescent state until the blended solution thickness into gel due to reaction of the alkali metal polysilica with the sulfuric acid.

The aqueous colloidal dispersion of alkali metal polysilica may be prepared continuously, preferably by blending the alkali metal polysilica with water. The alkali metal is preferably sodium. The resulting electrolyte consists of the alkali metal polysilica dispersed essentially uniformly throughout the liquid sulfuric acid and is homogeneous.

The specific gravity of the liquid sulfuric acid before mixing with the aqueous colloidal dispersion of alkali metal polysilica preferably ranges from about 1.2 to about 1.4 and most preferably is about 1.3 to about 1.4. Mixing the aqueous colloidal dispersion of the alkali metal polysilica and the liquid sulfuric acid is preferably performed dynamically, by blending these components in a stream while filling a lead-acid battery precursor with the stream being blended.

DESCRIPTION OF THE PREFERRED EMBODIMENTS AND BEST MODE KNOWN FOR PRACTICING THE INVENTION

Figure 1:
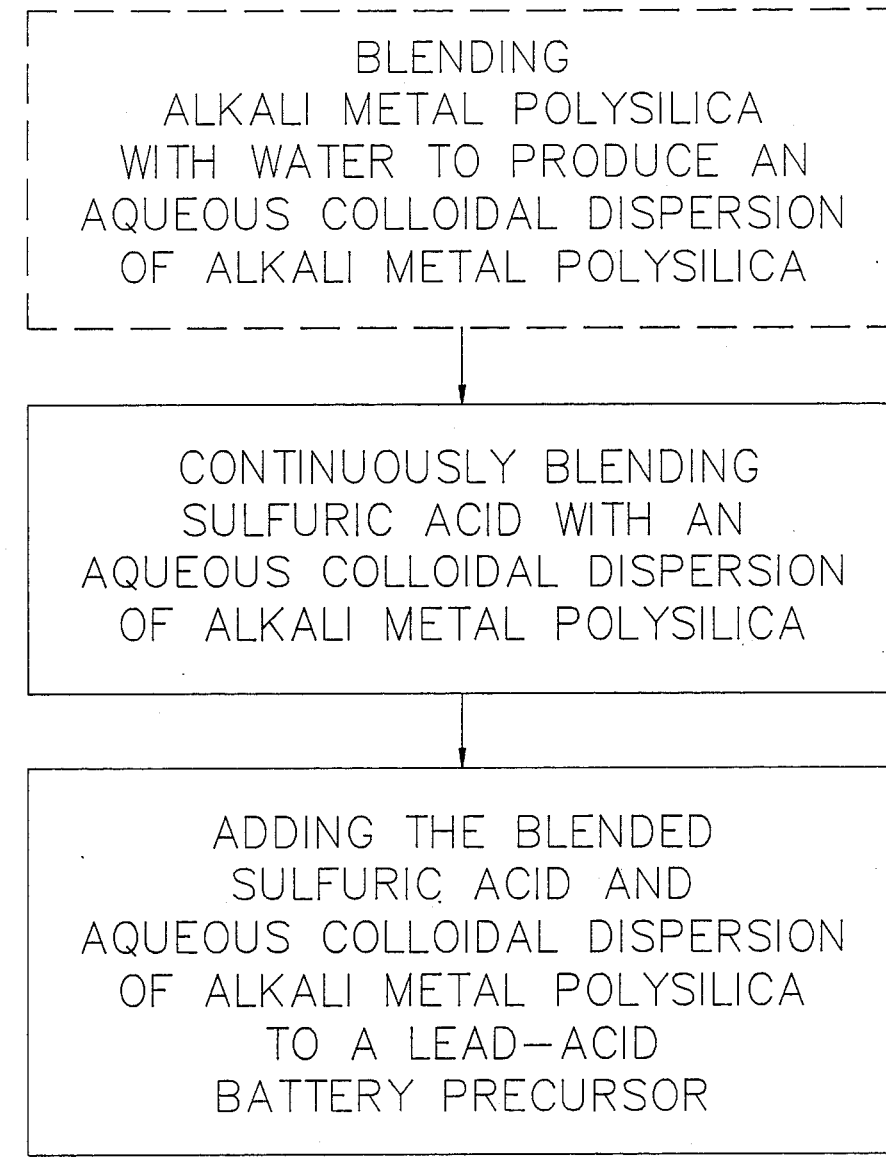
FIG. 1 is a schematic diagram illustrating the process of the invention.

Referring to the drawings and particularly to FIG. 1, the process of the invention may begin with an aqueous colloidal dispersion of an alkali metal polysilica. Suitable aqueous colloidal dispersions of alkali metal polysilica are commercially available.

As an alternative to purchasing the aqueous colloidal dispersion of the alkali metal polysilica, the aqueous colloidal dispersion may be prepared, preferably by continuously blending alkali metal polysilica, preferably sodium polysilica, with water. The optional, alternative nature of the step of continuously blending the alkali metal polysilica with water to obtain an aqueous colloidal dispersion of alkali metal polysilica is indicated in FIG. 1 by the dotted line forming the box enclosing this step of the process. The preferred process includes the steps enclosed in solid lines in FIG. 1.

The preferred sodium polysilica has a chemical formula of $[Y_2O] \cdot x[SiO_2] \cdot nH_2O$ where x ranges from about 20 to about 350. The exact percent of silicon dioxide by weight will depend on the specific gravity of the sulfuric acid electrolyte used and the concentration of polysilica desired. The sulfuric acid is conventional lead-acid battery liquid electrolyte.

Once the aqueous colloidal dispersion of the alkali metal polysilica has been prepared, concentrated sulfuric acid is added, preferably continuously, in an amount to result in a ratio of between about 1:1 to about 1:6 parts by volume of the aqueous colloidal dispersion of the alkali metal polysilica to sulfuric acid. This blend of sulfuric acid and the aqueous colloidal dispersion of the alkali metal polysilica is added, preferably continuously, to a battery precursor substantially as the sulfuric acid is blended with the aqueous colloidal dispersion of the alkali metal polysilica so that the resultant blend does not begin to gel before it has been introduced into the battery precursor. The blending is preferably performed in a nozzle while filling a lead-acid battery precursor with the blend.

Figure 2:
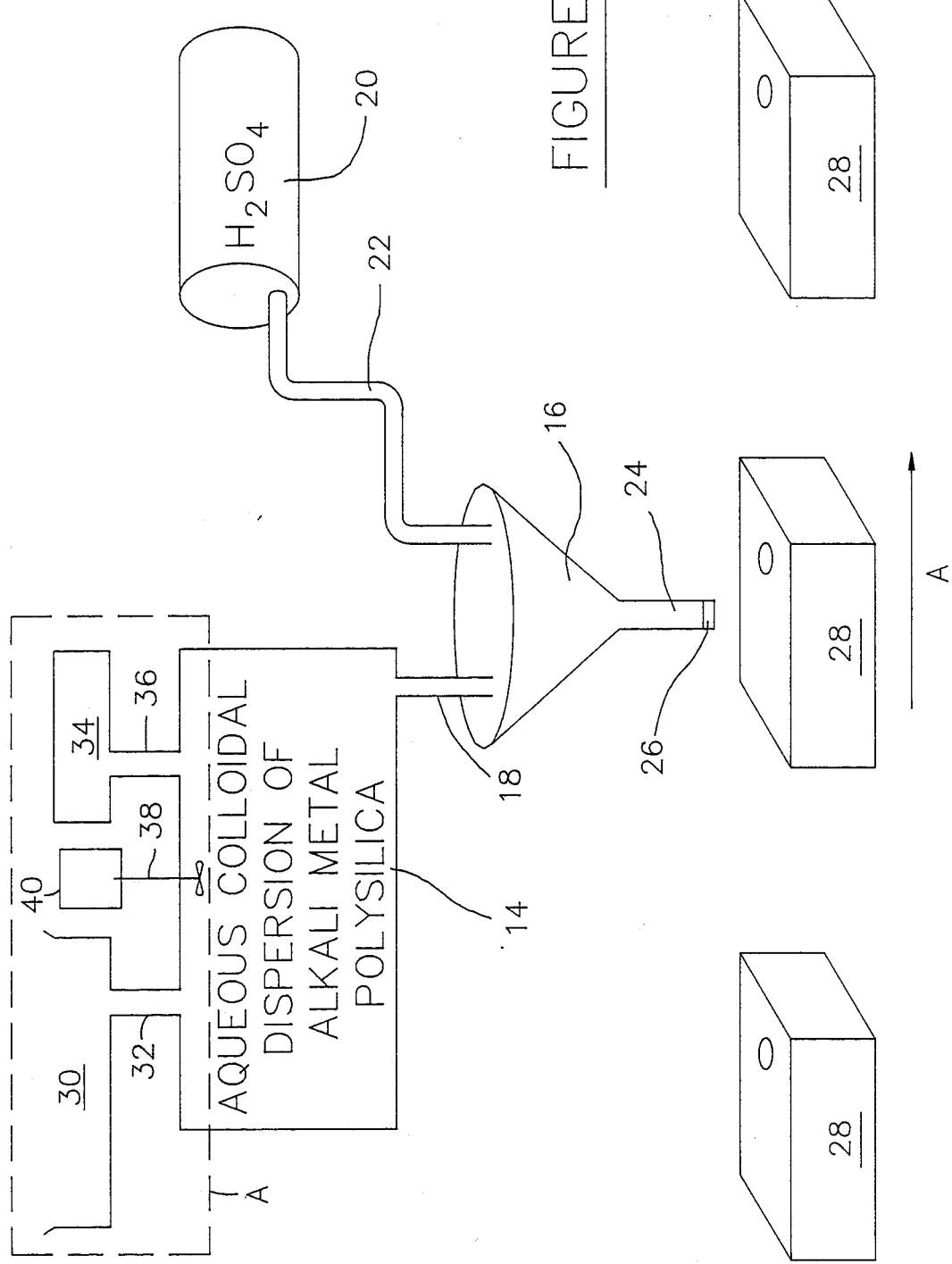
FIG. 2 is a schematic representation of apparatus useful for practicing the process of the invention.

Suitable apparatus for practicing the process aspect of the invention is illustrated schematically in FIG. 2 where the aqueous colloidal dispersion of alkali metal polysilica is illustrated being blended with sulfuric acid for introduction into lead-acid battery precursors. In FIG. 2 the aqueous colloidal dispersion of alkali metal polysilica is preferably within a tank 14 and is provided from tank 14 to a blending hopper 16 via line 18. Sulfuric acid is provided from tank 20 via line 22 to blending hopper 16. The solution of sulfuric acid and the aqueous colloidal dispersion of alkali metal polysilica preferably rapidly exits hopper 16 via conduit 24 with blending of the aqueous colloidal dispersion of the alkali metal polysilica and the sulfuric acid being performed in a nozzle 26, illustrated at the bottom of conduit 24, so that the blending is performed just as the combined blend is added to battery precursors 28.

The sulfuric acid is preferably forty (40) to fifty (50) weight percent sulfuric acid in tank 20 prior to being blended with the aqueous colloidal dispersion of the alkali metal polysilica.

Battery precursors 28 are formed, wet batteries from which the free electrolyte has been removed prior to addition of the blend of the aqueous colloidal dispersion of the alkali metal polysilica and the sulfuric acid. Use of such formed, wet batteries, as opposed to dry charged batteries which is the conventional practice in producing gelled electrolyte lead-acid batteries, greatly reduces manufacturing costs.

The dotted line box in FIG. 2 indicates the optional, alternative apparatus which may be provided if the aqueous colloidal dispersion of the alkali metal polysilica is prepared as a part of the process of the invention. In such case, dry alkali metal polysilica is provided from a storage hopper indicated generally as 30 to a blending tank 14 via a conduit 32. Water is provided from a storage tank 34 via a conduit 36 to blending tank 14. Within blending tank 14 a suitable mixing apparatus, designated schematically by mixing propeller and shaft 38 extending from motor 40, mixes th alkali metal polysilica with water to provide the required aqueous colloidal dispersion of alkali metal polysilica. The optional nature of this portion of the process is indicated by dotted box A in FIG. 2.

The specific performance characteristics of the batteries depends on concentration of acid in the battery. With fifty (50) weight percent sulfuric acid and using a commercially available aqueous colloidal dispersion of sodium polysilica having about thirty percent (30%) by weight sodium polysilica to water, an acceptable battery results. When the aqueous colloidal dispersion is about thirty percent (30%) by weight sodium polysilica to water, use of (1) part of the aqueous colloidal dispersion to about three (3) parts of sulfuric acid is satisfactory. The aqueous colloidal dispersion of sodium polysilica and the sulfuric acid go through a static mixer, specifically and preferably a nozzle, and are blended into a single combined solution as that solution is introduced into the battery precursor.

After the blended solution of the aqueous colloidal dispersion of the alkali metal silica and the sulfuric acid have been added to the battery precursor, the battery is maintained with the blended solution therein in a quiescent state until the blended solution thickens to a gel due to reaction of the alkali metal polysilica with the sulfuric acid.

The blend is added to the battery precursors as soon as possible after the forming electrolyte has been removed from the battery precursors. This is because once the forming electrolyte is removed, the exposed negative plates, if allowed to air-dry, undergo an oxidation reaction manifesting itself as discharge of the plates. Considerable heat is produced in the course of such self-discharge and this, of course, is undesirable.

The blend is preferably added to the battery precursors to a level slightly over the tops of the separators between the battery precursor plates, but not very much above the tops of those separators. The precursors are preferably sealed immediately after forming electrolyte is removed therefrom, while awaiting addition of the electrolyte blend which will gel while in the battery. The blend should be added within about thirty (30) minutes after the forming electrolyte has been removed. The battery precursors may be sealed promptly after the electrolyte blend is added to the precursors.

The optional method steps of the invention noted above, specifically combining the alkali metal polysilica with water to produce the aqueous colloidal dispersion of the alkali metal polysilica, may be advantageously practiced at the facility where the aqueous colloidal dispersion is subsequently combined with sulfuric acid and introduced into the battery precursors. This is because the aqueous colloidal dispersion, once formed, should not normally be subjected to temperatures below freezing. If subjected to such temperatures, the alkali metal polysilica may precipitate out of the colloidal dispersion; after precipitating out of the colloidal dispersion the alkali metal polysilica cannot be re-dispersed therein. Also, because the aqueous colloidal dispersion is normally alkaline, transport of the aqueous colloidal dispersion of the alkali metal polysilica may be inconvenient, thereby further favoring preparation of the aqueous dispersion of the alkali metal polysilica on site, where the batteries are manufactured.

Figure 3:
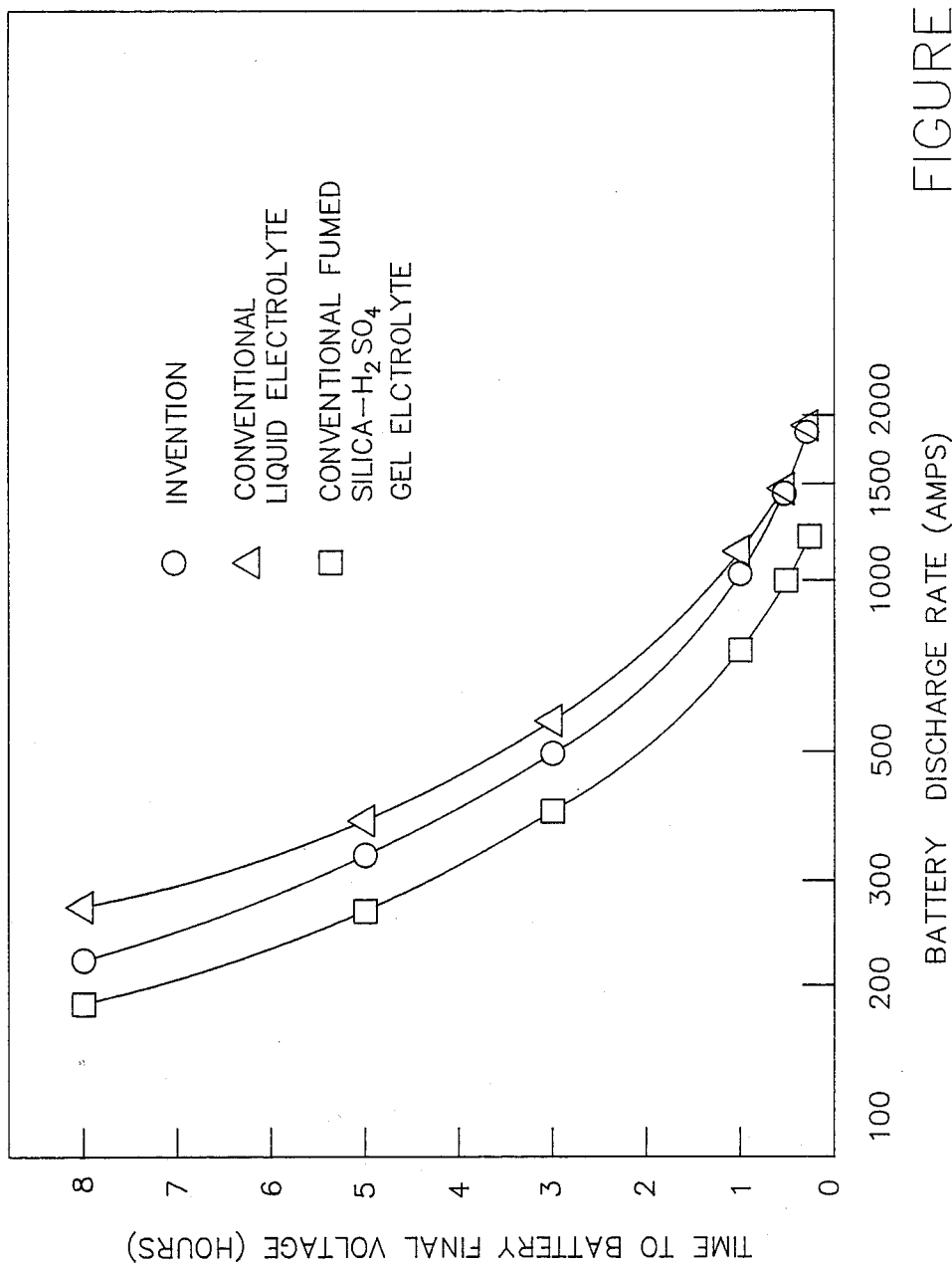
FIG. 3 is a curve comparing performance characteristics of a battery manifesting the invention to conventional liquid electrolyte and conventional fumed silica gelled electrolyte lead-acid batteries.

FIG. 3 illustrates a comparison of performance characteristics for batteries embodying the invention to comparable batteries utilizing conventional (ungelled) liquid sulfuric acid as the electrolyte and to comparable batteries utilizing a conventional combination of fumed silica and sulfuric acid as a gel electrolyte. In FIG. 3, the time for the battery to reach its final voltage, where final voltage is defined as a non-time varying voltage sustained by the battery as current is withdrawn from the battery at a given rate, is plotted as a function of battery discharge rate in amps, on a semi-log scale. Data for batteries embodying the invention is illustrated with circles indicating the data points, data for comparable batteries using conventional, ungelled liquid sulfuric acid electrolyte is illustrated with triangles indicating the data points and data for comparable batteries using fumed silica-sulfuric acid gelled electrolyte is illustrated with squares indicating the data points.

As illustrated in FIG. 3, batteries embodying the invention display surprising and unexpected performance improvements over comparable conventional fumed silica-sulfuric acid gelled electrolyte lead-acid batteries. Specifically, the characteristic curve of batteries embodying the invention is shifted to the right relative to the characteristic curve of a comparable, conventional fumed silica-sulfuric acid gelled electrolyte lead-acid battery. Indeed, as battery discharge rate increases (and time to final voltage correspondingly decreases), the characteristic curve of batteries embodying the invention assymptote to the characteristic curve of a comparable conventional (wet) liquid electrolyte lead-acid battery. Moreover, respecting comparison between batteries embodying the invention and conventional fumed silica-sulfuric acid lead-acid batteries, the shift to the right of the characterisic curve (in FIG. 3) for batteries embodying the invention manifests a substantial increase in the time for the battery to reach its final voltage for a given discharge rate. In other words, for a given rate of current produced, a battery embodying the invention takes a longer time to reach its final voltage (thereby indicating approach of the end of battery life) than a conventional fumed silica-sulfuric acid gelled electrolyte lead-acid battery. This means that batteries embodying the invention have greater discharge life expectancy than comparable conventional fumed silica-sulfuric acid gelled electrolyte lead-acid batteries.

From FIG. 3, at a time to reach final voltage of eight hours, batteries embodying the invention manifest about a fifteen (15%) percent increase in discharge rate, (meaning that about fifteen (15%) percent more current is supplied by the battery) as compared to a conventional fumed silica-sulfuric acid gelled electrolyte lead-acid battery. Similarly, at the other end of the curves (one hour to reach final voltage), batteries embodying the invention produce nearly twenty-five (25%) percent more current over the time it takes for the batteries to reach their final, non-time varying voltage, as compared to current produced by conventional fumed silica-sulfuric acid gelled electrolyte lead-acid batteries.

Perhaps of greatest significance is the fact that at progressively higher discharge rates, batteries embodying the invention manifest performance characteristics that asymptotically approach that of conventional (wet) liquid electrolyte lead-acid batteries, as illustrated by FIG. 3.

The following is claimed:

1. In a lead-acid battery an improved thixotropic gel electrolyte consisting essentially of a blend of an aqueous colloidal dispersion of about thirty percent by weight alkali metal polysilica having the formula $[Y_2O] \cdot x[SiO_2] \cdot nH_2O$, where x ranges from about 20 to about 350, Y is an alkali metal and n is moles of water with sulfuric acid in a ratio of from about one part aqueous colloidal dispersion of alkali metal polysilica to about three parts sulfuric acid to about one part aqueous colloidal dispersion of alkali metal polysilica to about six parts of sulfuric acid by volume, said blend being essentially homogeneous.

2. The gel of claim 1 wherein said alkali metal is sodium.

3. A lead-acid battery comprising:
   a. a battery case;
   b. a plurality of positive and negative metal plates spaced apart one from another within said case; and
   c. a thixotropic gel electrolyte within said case and providing electrolytic connection between said positive and negative plates, said thixotropic gel electrolyte comprising: a blend of an aqueous colloidal dispersion of about thirty percent by weight alkali metal polysilica having the formula $[Y_2O] \cdot x[SiO_2] \cdot nH_2O$, where y is an alkali metal, x ranges from about 20 to about 350 and n is the number of moles of water, with sulfuric aic in a ratio of from about one part sulfuric acid to three parts aqueous colloidal dispersion of alkali metal polysilica to about one part sulfuric acid to about six parts of aqueous colloidal dispersion of alkali metal polysilica by volume, said blend being essentially homogeneous.

4. The battery of claim 3 wherein said alkali metal is sodium.

5. A lead-acid battery comprising:
 a. a battery case
 b. a plurality of positive and negative metal plates spaced apart one from another within said case; and
 c. a thixotropic gel electrolyte within said case and providing electrolyte connection between said positive and negative plates, said thixotropic gel electrolyte comprising a blend of
  i. an aqueous solution of alkali metal polysilica having the formula $[Y_2O] \cdot [SiO_2]$, where Y is an alkali metal; and
  ii. sulfuric acid 6. The battery of claim 5 wherein said solution is a colloidal dispersion.

7. The battery of claim 6 wherein said blend is essentially homogeneous.

8. The battery of claim 7 wherein said aqueous colloidal dispersion of alkali metal polysilica has the formula $[Y_2O] \cdot x[SiO_2] \cdot nH_2O$, where x ranges from about 20 to about 350 and n is the number of moles of water.

9. The battery of claim 8 wherein said aqueous colloidal dispersion is about thirty percent (30%) by weight alkali metal polysilica.

10. The battery of claim 9 wherein said blend is in a ratio of from about one part sulfuric acid to three parts aqueous colloidal dispersion of alkali metal polysilica to about one part sulfuric acid to about six parts of aqueous colloidal dispersion of alkali metal polysilica, by volume.

11. The battery of claim 10 wherein said alkali metal is sodium.

12. The battery of claim 7 wherein said alkali metal is sodium.

13. The battery of claim 5 wherein said alkali metal is sodium.

14. In a lead-acid battery, an improved highly viscous electrolyte comprising a mixture of an aqueous solution of polysilica having the formula $[Y_2O] \cdot [SiO_2]$, where Y is an alkali metal, and sulfuric acid.

15. The lead-acid battery of claim 14 wherein said aqueous solution of polysilica is about thirty percent (30%) by weight alkali metal polysilica and said solution ranges from about one (1) part aqueous solution of alkali metal polysilica to about three (3) parts sulfuric acid to about one (1) part aqueous solution of alkali metal polysilica to about six (6) parts sulfuric acid, by volume.

16. The lead-acid battery of claim 15 wherein said aqueous solution of polysilica is an aqueous colloidal dispersion of about thirty percent by weight alkali metal polysilica having the formula $[Y_2O] \cdot x[SiO_2] \cdot nH_2O$, where x ranges from about 20 to about 350, Y is an alkali metal and n is the number of moles of water.

17. The lead-acid battery of claim 16 wherein said mixture is essentially homogeneous.

18. The lead-acid battery of claim 17 when said alkali metal is sodium.

19. The lead-acid battery of claim 16 wherein said alkali metal is sodium.

20. A highly viscous lead-acid battery electrolyte comprising a mixture of an aqueous solution of polysilica having the formula $[Y_2O] \cdot x[SiO_2]$, where Y is an alkali metal and x ranges from about 20 to about 350, and sulfuric acid, wherein said solution ranges from about one (1) part aqueous solution of alkali metal polysilica to about three (3) parts sulfuric acid to about one (1) part aqueous solution of alkali metal polysilica to about six (6) parts sulfuric acid, by volume.

21. The lead-acid battery electrolyte of claim 20 wherein said aqueous solution of polysilica is an aqueous colloidal dispersion of about thirty percent by weight alkali metal polysilica having the formula $[Y_2O] \cdot x[SiO_2] \cdot nH_2O$, where n is the number of moles of water.

22. The lead-acid battery electrolyte of claim 20 wherein said mixture is essentially homogeneous.

23. The lead-acid battery electrolyte of claim 22 wherein said alkali metal is sodium.

24. The lead-acid battery electrolyte of claim 20 wherein said alkali metal is sodium.

25. A thixotropic electrolyte for a lead-acid battery consisting essentially of a blend of an aqueous colloidal dispersion of about thirty percent (30%) by weight alkali metal polysilica having the formula $[Y_2O] \cdot x[SiO_2] \cdot nH_2O$, where x ranges from about 20 to about 350, Y is an alkali metal and n is the number of moles of water, with sulfuric acid in a ratio of from about one (1) part aqueous colloidal dispersion of alkali metal polysilica to about three (3) parts sulfuric acid to about one (1) part aqueous colloidal dispersion of alkali metal polysilica to about six (6) parts sulfuric acid by volume, said blend being essentially homogeneous.

26. The electrolyte of claim 25 wherein said alkali metal is sodium.

27. Electrolyte for a lead-acid battery consisting essentially of a mixture of an aqueous solution of polysilica having the formula $[Y_2O] \cdot [SiO_2]$, where Y is an alkali metal, and sulfuric acid.

28. The electrolyte of claim 27 wherein said alkali metal is sodium.

29. A lead-acid battery comprising:
 a. a battery case
 b. positive and negative metal plates spaced one from another within said case; and
 c. a thixotropic gel electrolyte within said case and providing electrolytic connection between said positive and negative plates, comprising
  i. alkali metal polysilica;
  ii. sulfuric acid; and
  iii. water.

30. The battery of claim 29 wherein said alkali metal polysilica has the formula $[Y_2O] \cdot [SiO_2]$, where Y is an alkali metal.

31. The battery of claim 30 wherein said alkali metal polysilica is in an aqueous solution.

32. The battery of claim 31 wherein said solution is a colloidal dispersion.

33. The battery of claim 32 wherein said aqueous colloidal dispersion of alkali metal polysilica has the formula $[Y_2O] \cdot x[SiO_2] \cdot nH_2O$, where x ranges from about 20 to about 350 and n is the number of moles of water.

34. The battery of claim 33 wherein said aqueous colloidal dispersion is about thirty percent (30%) by weight alkali metal polysilica.

35. The battery of claim 34 wherein said alkali metal is sodium.

36. The battery of claim 29 wherein said alkali metal is sodium.

37. Electrolyte for a lead-acid battery comprising polysilica having the formula $[Y_2O]\cdot[SiO_2]$, where Y is an alkali metal, sulfuric acid and water.

38. The electrolyte of claim 37 wherein said alkali metal is sodium.

39. A lead-acid battery comprising:
 a. a battery case
 b. positive and negative metal plates spaced one from another within said case; and
 c. a thixotropic gel electrolyte within said case and providing electrolytic connection between said positive and negative plates, comprising:
  i. sodium polysilica;
  ii. sulfuric acid; and
  iii. water.

40. Electrolyte for a lead-acid battery consisting essentially of sodium polysilica, sulfuric acid and water.

* * * * *